(12) United States Patent
Herröder et al.

(10) Patent No.: US 9,046,122 B2
(45) Date of Patent: Jun. 2, 2015

(54) ASSEMBLY OF THERMOPLASTIC EXTRUSION BLOW MOLDED COMPONENT AND FASTENING ELEMENT

(75) Inventors: Alexander Herröder, Breitscheidt (DE); Thomas Malcher, Hennef (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 952 days.

(21) Appl. No.: 12/532,709

(22) PCT Filed: Feb. 14, 2008

(86) PCT No.: PCT/EP2008/001108
§ 371 (c)(1),
(2), (4) Date: Jan. 25, 2010

(87) PCT Pub. No.: WO2008/116529
PCT Pub. Date: Oct. 2, 2008

(65) Prior Publication Data
US 2010/0135747 A1    Jun. 3, 2010

(30) Foreign Application Priority Data
Mar. 23, 2007 (DE) .......................... 10 2007 014 601

(51) Int. Cl.
*F16B 39/32* (2006.01)
*B29C 49/54* (2006.01)
*B29C 49/04* (2006.01)

(52) U.S. Cl.
CPC ................. *F16B 39/32* (2013.01); *B29C 49/04* (2013.01); *B29C 49/54* (2013.01); *B29C 2049/546* (2013.01)

(58) Field of Classification Search
CPC .. B29C 49/54; B29C 2793/009; B29C 49/04; B29D 1/00; B29L 2001/00; F16B 39/32
USPC .............. 411/366.1, 429, 187, 188, 337, 349, 411/554, 366.3; 403/349, 263
See application file for complete search history.

(56) References Cited

U.S. PATENT DOCUMENTS 1,938,063 A * 12/1933 Burke ............................ 215/252
2,486,411 A * 11/1949 Huelster ........................ 411/551
(Continued)

FOREIGN PATENT DOCUMENTS

DE      633410       7/1936
DE      1251009      9/1967
(Continued)

OTHER PUBLICATIONS
International Search Report dated Jun. 11, 2008 issued in related International Patent Application No. PCT/EP2008/001108.
(Continued)

*Primary Examiner* — Gay Ann Spahn
(74) *Attorney, Agent, or Firm* — Grossman Tucker Perreault & Pfleger, PLLC

(57) ABSTRACT

The invention relates to an extrusion blow-molded component (1) made of thermoplastic resin. The component (1) preferably comprises a recess in the exterior wall, the recess being configured as a blind bore (2) provided with at least one convolution (4). The blind bore (2) serves to receive a complementary fastening element (6) equipped with a threaded stem (17). A contour is provided in the region of the orifice (3) of the blind bore (2), the contour positively interacting with a contour that is complementary on the fastening element upon insertion of the fastening element (6), wherein the angular position of the contour (2) is selected such that inserting the contours into each other is possible only by overcoming an axial tension that is built up due to the rotating movement of the parts to each other under elastic deformation of the plastic (FIG. 1).

9 Claims, 2 Drawing Sheets

(56) References Cited

U.S. PATENT DOCUMENTS

Figure 1:
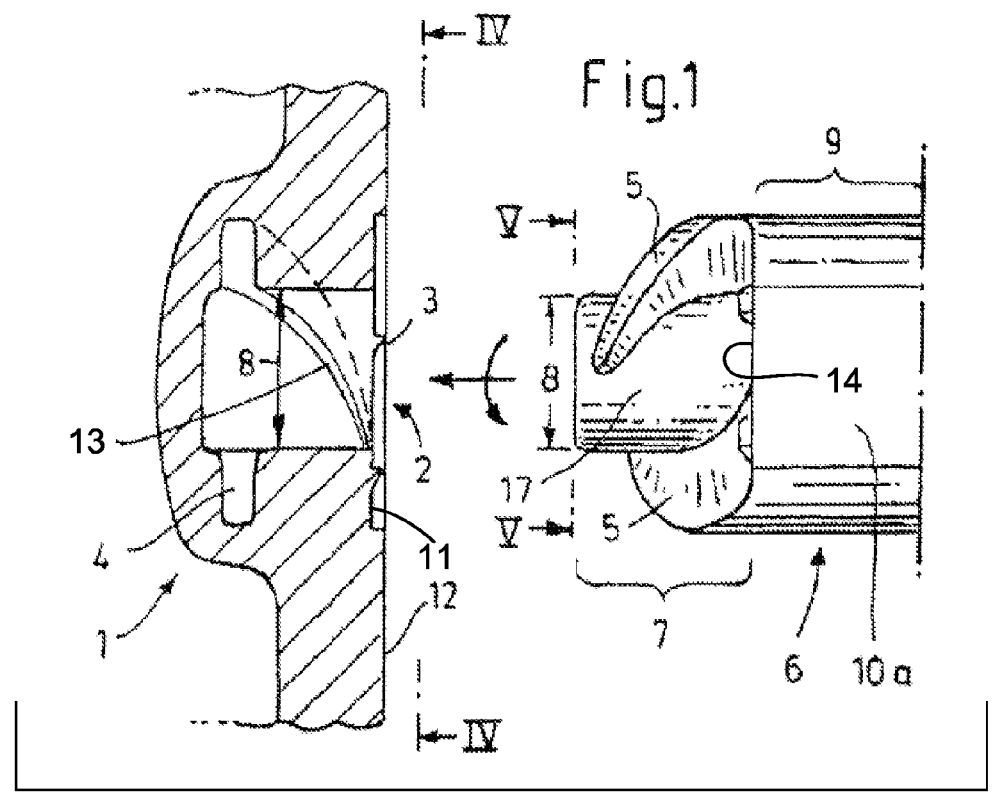

| | | | | |
|---|---|---|---|---|
| 2,884,677 | A | * | 5/1959 | Zahodiakin ............... 411/552 |
| 3,136,017 | A | * | 6/1964 | Preziosi .................... 411/552 |
| 3,152,822 | A | * | 10/1964 | Griffiths ................... 411/549 |
| 3,169,293 | A | * | 2/1965 | Neuschotz ................. 411/552 |
| 3,574,333 | A | * | 4/1971 | Ohara ....................... 215/295 |
| 3,608,763 | A | * | 9/1971 | Smith et al. .............. 215/217 |
| 3,675,280 | A | * | 7/1972 | Winslade ................... 411/552 |
| 3,809,276 | A | * | 5/1974 | Landen ...................... 215/332 |
| 3,955,696 | A | * | 5/1976 | Finke ........................ 215/214 |
| 3,989,442 | A | * | 11/1976 | Confer et al. ............ 425/503 |
| 4,442,561 | A | * | 4/1984 | Gunther .................... 470/12 |
| 4,913,299 | A | * | 4/1990 | Petro ........................ 215/330 |
| 5,020,692 | A | * | 6/1991 | Darr .......................... 222/109 |
| 5,056,675 | A | * | 10/1991 | Julian ....................... 215/252 |
| 5,178,504 | A | * | 1/1993 | Falchi ....................... 411/553 |
| 5,450,972 | A | * | 9/1995 | Zemlo ....................... 215/252 |
| 5,533,633 | A | * | 7/1996 | King ......................... 215/252 |
| 5,690,460 | A | * | 11/1997 | Attanasio ................. 411/551 |
| 5,845,798 | A | * | 12/1998 | Carrier ...................... 215/330 |
| 5,897,010 | A | * | 4/1999 | Soyka et al. ............. 215/390 |
| 6,082,565 | A | * | 7/2000 | Harrold .................... 215/218 |
| 6,182,822 | B1 | * | 2/2001 | Albisetti ................... 206/221 |
| 8,544,666 | B2 | * | 10/2013 | Velmer et al. ............ 215/331 |
| 2002/0096519 | A1 | | 7/2002 | Joost et al. |
| 2005/0067414 | A1 | | 3/2005 | Lipson |
| 2005/0244249 | A1 | * | 11/2005 | Sussenbach ............. 411/411 |
| 2006/0001270 | A1 | * | 1/2006 | Kobayashi et al. ...... 292/2 |
| 2011/0150602 | A1 | * | 6/2011 | Sieper et al. ............. 411/378 |

FOREIGN PATENT DOCUMENTS

| | | |
|---|---|---|
| DE | 1251009 B | 9/1967 |
| DE | 2239261 | 3/1973 |
| DE | 2453060 | 5/1976 |
| DE | 2943400 | 5/1980 |
| DE | 3114504 | 10/1982 |
| DE | 4004640 | 8/1991 |
| DE | 20016445 | 2/2002 |
| DE | 10162837 | 7/2003 |
| GB | 278586 | 10/1927 |
| GB | 1480282 | 7/1977 |
| GB | 2041135 | 9/1980 |
| JP | 62279914 | 12/1987 |
| JP | 06218799 | 9/1994 |
| JP | 07217784 | 8/1995 |
| JP | 10011997 | 1/1998 |
| JP | 2001122301 | 8/2001 |
| JP | 2003019743 | 1/2003 |
| JP | 2003281872 | 10/2003 |

OTHER PUBLICATIONS

International Preliminary Report on Patentability and Written Opinion dated Oct. 6, 2009 issued in related International Patent Application No. PCT/EP2008/001108.

Japanese Office Action issued on Dec. 7, 2011 with English language translation, received in Japanese Patent Application No. 2010-500091, 7 pgs.

* cited by examiner

ASSEMBLY OF THERMOPLASTIC EXTRUSION BLOW MOLDED COMPONENT AND FASTENING ELEMENT

CROSS-REFERENCE TO RELATED APPLICATIONS

This application is a national phase application of PCT application no. PCT/EP2008/001108 filed Feb. 14, 2008, which claims priority to German application serial no. 10 2007 014 601.1 filed Mar. 23, 2007 which are hereby incorporated by reference.

FIELD

The invention relates to an extrusion blow molded component made of thermoplastic having at least one recess in the wall thereof, the recess being configured as a blind hole provided with at least one thread for accommodating a complementary fastening element.

The invention additionally relates to a method of producing such an extrusion blow molded component.

BACKGROUND

An extrusion blow molded component made of thermoplastic having a blind hole provided in the wall thereof, which blind hole is provided with a thread, is known, for example, from published German patent application DE 2 453 060. DE 2 453 060 describes a method of producing a connecting piece open on both sides and provided with an internal thread in a flat or curved plastics wall deformable in the thermoplastic state. A plug piece is provided with an internal thread and threads projecting into the interior of a plastics container are produced using an expandable mold core when shaping the container. In this case, to form an internally threaded connecting piece initially open on one side, the mold core is pressed, with lengthwise movement, perpendicularly into the thermoplastically deformable plastics wall. Once the threaded connecting piece has been shaped as a blind hole, the radially stressed, disc-shaped base part of the connecting piece is pierced. Finally, the mold core is removed once the plastic has solidified. In this way, a connecting piece with an internal thread shaped during blow molding is simply produced for an extrusion blow molded plastics container.

When producing extrusion blow molded components, in particular when producing containers, it is in principle also known to provide threads therein by encapsulating inserts by blow molding.

A method is known from German patent 1 251 009 for producing a hollow body provided with a threaded bushing from a thermoplastic, in which method a parison is expanded in a manner known per se inside a mold cavity. Upon expansion of the parison, the threaded bushing is enclosed thereby and blow molded therein.

In this way, an extrusion blow molded component is obtained, whose outer wall is configured for mounting a fastening element cooperating with the thread. The threaded bushing enclosed by the component allows simple mounting of fastening elements provided with a matching thread.

The above-described method is relatively complex, insofar as a threaded bushing has to be provided as a component to be produced in a separate operation. For example, such a threaded bushing may be produced by injection molding from a material which is weldable to the container wall. For fastening components undetachably to the container wall, encapsulation of threaded bushings by blow molding tends to be less advantageous. If industrial components need to be produced with a plurality of fastening points, this cannot be achieved by means of the above-described method without excessive effort.

SUMMARY

The object of the invention is therefore to improve an extrusion blow molded component in such a way as to make it possible to fasten fastening elements undetachably to the component. In so doing, the intention is as far as possible to avoid a bonded joint produced by welding, adhesive bonding or the like. It is also intended that the fastening should be so configured that it may be simply produced without using inserts.

The object is firstly achieved by an extrusion blow molded component made of thermoplastic having at least one recess in the wall thereof, which is formed as a blind hole provided with at least one thread for accommodating a complementary fastening element, the component being distinguished in that, in the area of the mouth of the blind hole, at least one contour is provided which cooperates form-fittingly, on insertion of the fastening element, with a contour complementary thereto on the fastening element, the angular position of the contour being selected in such a way relative to the thread of the blind hole that fitting together of the contours is only possible by overcoming an axial tension built up by rotary motion of the parts relative to one another by resilient deformation of the plastic.

The blind hole and the fastening element cooperate according to the invention both form-fittingly and force-lockingly in the manner of a bayonet joint. Bayonet joints are force-locking and form-fitting, generally directly detachable joints between two components, which are rotationally symmetrical at least at the connection point and which are inserted axially one behind the other and are hooked together by mutual twisting.

The extrusion blow molded component according to the invention has the advantage of being able to cooperate with various fastening elements in this way without the need to pierce the container walls or cause damage thereto, for example, by welding or adhesively bonding components thereon. A component produced in this way may be provided with a plurality of appropriately configured recesses, which may be arranged such that for example, if the component is provided as an industrial component, for example as a fuel tank, the number of producible variants may in this way be increased relatively inexpensively. When producing fuel tanks it is possible, for example, to produce a fuel tank for different automobile models which is equipped in various variants with attachments and fittings.

In one variant of the component according to the invention provision is made for a plurality of mutually spaced recesses and/or projections to be provided around the circumference of the mouth of the blind hole, which recesses and/or projections cooperate with complementary recesses and/or projections of the fastening element.

The recesses and projections are in this case advantageously arranged relative to one another in such a way that the fastening element has to be twisted in the blind hole, while building up tension, until the recesses and projections engage form-fittingly in one another or snap together.

A convenient variant of the extrusion blow molded component according to the invention comprises a fastening element which comprises a threaded stem, which corresponds to the core diameter of the blind hole, and in which a shank at least in part without a thread adjoins the threaded stem.

In one advantageous variant of the extrusion blow molded component according to the invention provision is made for the mouth of the blind hole to have a diameter which is greater than the core diameter of the blind hole, for the cross-sectional contour of the mouth to be of non-rotationally symmetrical construction and for the shank of the fastening element to comprise a cross-sectional contour at least over part of its length which is conformed to the cross-sectional contour of the mouth of the blind hole. In this way, when producing the rotary joint between fastening element and blind hole, axial tension is built up which decreases in part when the cross-section of the shank of the fastening element is inserted into the mouth of the blind hole. If this mouth portion takes the form of an appropriately deep indentation, form-fitting securing of the fastening element in the blind hole is thereby achieved.

The invention should be understood in that, instead of the blind hole indentation, a corresponding elevation in the wall of the component may be provided, which cooperates with a contour complementary thereto in the shank of the fastening element.

Preferably the blind hole comprises two threads, which cooperate with two threads on the threaded portion of the fastening element.

It is particularly advantageous for the threads to be relatively steep, for example, to be at an angle of greater than or equal to 30°, preferably of around 45°, relative to a longitudinal axis of the blind hole. In this way, a relatively large axial movement is achieved with a relatively small angle of rotation, such that the fastening element may be fully screwed in and locked, for example, with a quarter turn)(90°).

The extrusion blow molded component may take the form, for example, of a substantially closed container. It is particularly preferably configured as an automotive fuel tank. Such a fuel tank has to have attachments, nipples, hoses or the like fastened to its outer circumference. In fuel tanks known from the prior art, such nipples, hoses and other attachments are generally welded to the outer wall of the tank. It is particularly important for a fuel tank to have an outer wall of undisturbed, undamaged profile. For this reason, the provision of a snap-in or bayonet joint in the container wall for fixing attachments, nipples, hoses or the like has proven particularly favorable. Such a snap-in or bayonet joint is also particularly desirable for reasons of simple, quick mounting of the fittings.

Although it is the case with the invention that the position on the container of the blind hole and of the fastening element cooperating therewith should not be considered critical, and such fastening means may thus also be provided inside the container, the blind hole is conveniently provided in the outer wall of the container.

The object of the invention is furthermore achieved by a method of producing an extrusion blow molded component of the above described type. The method comprises extrusion of a parison from a plasticized thermoplastic and expansion of the parison in a multipart blowing mold using at least one mold core provided in the mold and extendable into and retractable from the cavity of the mold.

The mold core may, for example, be of multipart construction, the outer contour of the mold advantageously corresponding at least in part to the outer contour of the fastening element.

In one variant of the method, provision is made for the parison to be expanded in the cavity against the extended mold core and for the mold core to be removed immediately after shaping of the component or during demolding of the component.

Alternatively, it would be possible to press or screw the mold core into the still plastic wall of the parison which has been expanded in the mold. Withdrawal of the mold core out of the cavity of the mold may likewise be effected, for example, by way of a rotary motion, it being advantageous for the mold core to be of multipart construction, so simplifying removal of the mold core.

Alternatively, the mold core may be forcibly demolded after appropriate solidification of the article expanded in the mold, i.e. with resilient deformation of the wall of the component.

FIGURES

Figure 2:
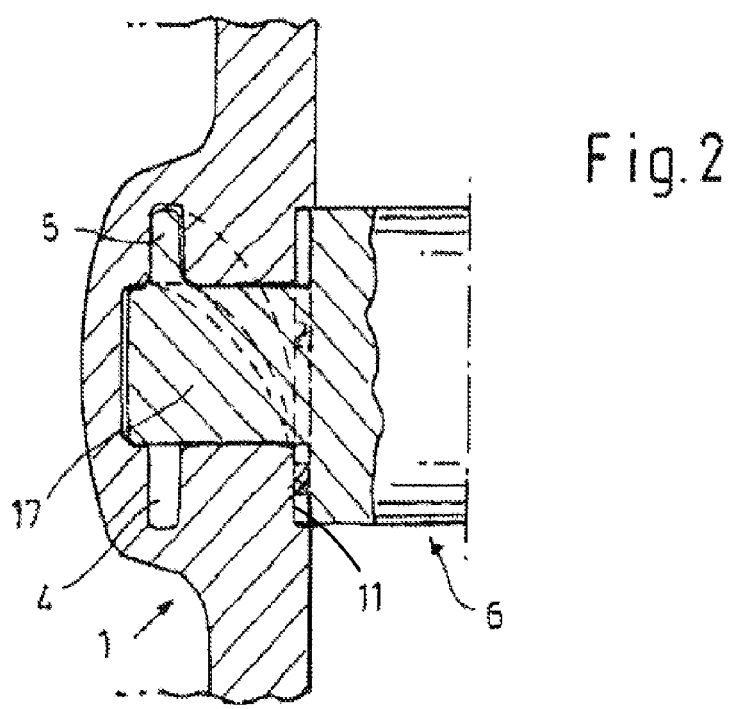
Figure 3:
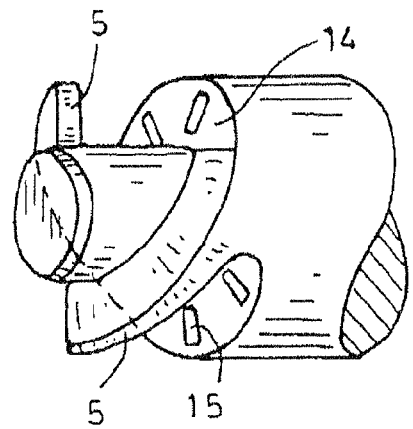
Figure 4:
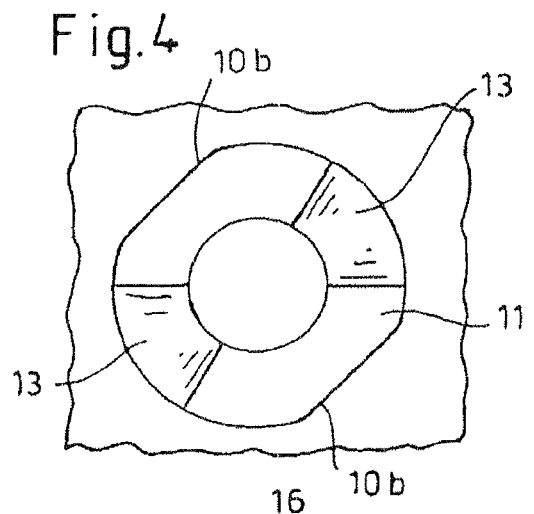
Figure 5:
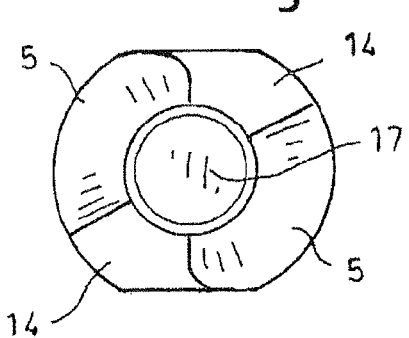
Figure 6:
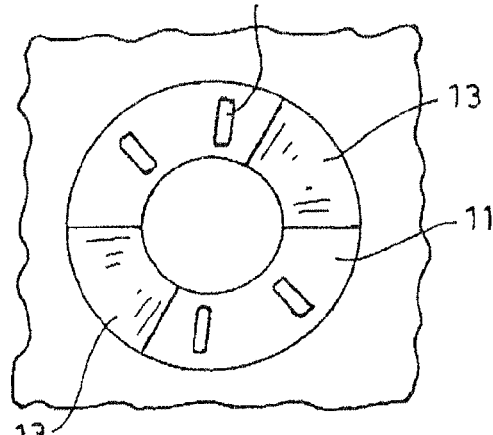
Figure 7:
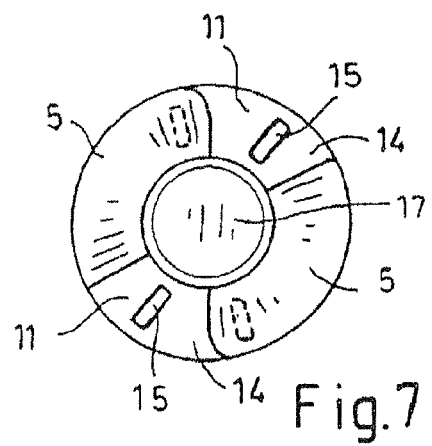

The invention will be explained below with reference to an exemplary embodiment shown in the drawings, in which:

FIG. 1 shows a section through the wall of the component according to the invention in the area provided for accommodating the fastening element likewise shown in FIG. 1 (fastening element not shown in cross-section view), FIG. 2 is a sectional view of the fastening area of the component according to the invention with the fastening element of FIG. 1 inserted therein (fastening element shown in partial cross-sectional view), FIG. 3 is a perspective view of a second embodiment of the fastening element, FIG. 4 is a view in the direction IV-IV indicated in FIG. 1, FIG. 5 is a view in the direction of the arrows V-V indicated in FIG. 1, FIG. 6 is a view corresponding to FIG. 4 with an alternative embodiment of the component according to the invention, and FIG. 7 is a view corresponding to FIG. 5, which shows the end face of the fastening element according to the first exemplary embodiment shown in FIG. 1.

DETAILED DESCRIPTION

Reference numeral 1 denotes an extrusion blow molded component made of thermoplastic according to the invention. The extrusion blow molded component 1 may, for example, comprise a multilayer extruded fuel tank of thermoplastic. This fuel tank may be of one piece construction. As has already been described above, it is conventional with such fuel tanks to fasten components to the inner wall thereof or indeed to the outer wall thereof by means of welding. To this end, it was necessary hitherto to make components to be attached to the tank from a plastic which was compatible from the point of view of weldability to the tank. For example, the inner and outer layers of a multilayer coextruded fuel tank consist of a thermoplastic, conventionally of polyethylene. Fastening means of ABS, polyoxymethylene or a similar material cannot be straightforwardly welded to polyethylene. Such components have hitherto been fastened to the fuel tank using retaining clips, the retaining clips in turn being themselves welded to the wall of the fuel tank.

FIG. 1 shows a section through a wall of an extrusion blow molded component 1 of the above described type. A blind hole 2 is provided in the wall of the component 1, the mouth 3 of which blind hole points outwards.

The blind hole 2 was produced during extrusion blow molding of the component 1 using a mold core provided in the mold and extendable into and retractable from the cavity of the mold. The blind hole 2 is provided with two threads 4, which cooperate with correspondingly configured thread beads 5 on a fastening element 6. The fastening element 6 comprises a threaded stem 17, whose core diameter 8 corresponds roughly to the core diameter 8 of the blind hole 2. The threaded portion 7 with the threaded stem 17 is adjoined by an unthreaded portion 9, whose cross-section in the exemplary embodiment shown in FIG. 1 is not of rotationally symmetrical construction, the unthreaded portion 9 instead having in each case identical flattened portions 10*a* on two diametrically opposed sides.

The unthreaded portion 9 is additionally adjoined by part of the fastening element, which may, for example, take the form of a retaining clip for a line or for another component. This area of the fastening element 6 may be constructed in any desired manner and is therefore not shown here. The fastening element 6 may take the form, for example, of a base of a container, which is to be connected to the component 1.

As is clear, in particular from FIGS. 1 and 4 taken together, the diameter of the blind hole 2 in the area of the mouth 3 thereof or in the peripheral area of the blind hole 2 defined by the core diameter 8 is larger, such that a circumferential step 11 is formed which surrounds the core diameter 8 of the blind hole 2. When viewed from the outside, the step 11 forms an indentation in the wall 12 of the component 1.

In the exemplary embodiment shown in FIGS. 1 and 4, the step 11 in the area of the mouth 3 of the blind hole 2 is not of rotationally symmetrical construction, instead likewise comprising two flattened portions 10*b* arranged diametrically opposite one another, the cross-sectional contour of the step 11 or of the blind hole 2 in the area of the mouth 3 corresponding to the cross-sectional contour of the unthreaded portion 9 of the fastening element 6.

The flattened portions 10*b* of the step 11 of the mouth 3 of the blind hole 2 are, as is shown in FIG. 4, arranged in each case offset by 90° in each case relative to the thread ramps 13 visible in plan view. The fastening element 6 is of matching configuration, such that when the threaded portion 7 of the fastening element 6 is screwed into the blind hole 2, the end face 14 of the unthreaded portion 9 of the fastening element 6 initially rests against the wall 12 of the component after partial rotation of the fastening element 6. The fastening element 6 may then be turned further only with the build-up of axial tension acting against the screwing-in direction. Overcoming the resilient deformability of the plastic, upon further turning, the end face 14 of the fastening element 6 fits with its contour complementary to the step 11 into said step 11. In this way, a form-fit is produced between the contour of the end face 14 of the fastening element 6 and the contour of the step 11, which form-fit secures the joint.

The flattened portions 10*a* advantageously additionally enable tool engagement, for example in order to be able to cooperate with a correspondingly configured spanner head.

As an alternative to the solution illustrated in FIG. 1 and in FIGS. 4 and 5, in which an indentation in the mouth area of the blind hole 2 is of non-rotationally symmetrical geometry and the end face 14 of the fastening element 6 is of complementary configuration, snap-in recesses 16 may be provided in the end face 14 of the step 11, as shown, for example, in FIGS. 6 and 7, which recesses cooperate with corresponding snap-in projections 15 on the end face of the unthreaded portion 9. In this case both the step 11 and the end face 14 of the fastening element 6 are of rotationally symmetrical cross section.

The thread formed in the blind hole 2 is dimensioned from the standpoint of thread angle such that the fastening element can be fully screwed in or out with a quarter turn.

LIST OF REFERENCE NUMERALS

1) Extrusion blow molded component
2) Blind hole
3) Mouth
4) Threads
5) Thread beads
6) Fastening element
7) Threaded portion
8) Core diameter
9) Unthreaded portion
10*a*) Fastening element flattened portions
10*b*) Component flattened portions
11) Step
12) Wall
13) Thread ramps
14) End face
15) Snap-in projections
16) Snap-in recesses
17) Threaded stem

What is claimed is:

1. An assembly comprising:
   a fastening element;
   an extrusion blow molded component made of thermoplastic having at least one recess in a wall thereof, which is formed as a blind hole provided with at least one thread for accommodating the fastening element,
   wherein, in an area of a mouth of the blind hole, at least one contour is provided which cooperates form-fittingly, on insertion of the fastening element by rotational motion, with a contour complementary thereto on the fastening element, an angular position of the contour of the fastening element being arranged relative to the contour of the blind hole such that, during a rotational motion of the extrusion blow molded component and the fastening element relative to one another, fitting together of the contours is only possible by overcoming an axial tension that is built up due to the rotating movement of the extrusion blow molded component and the fastening element relative to one another under elastic deformation of the thermoplastic,
   wherein the fastening element comprises a threaded stem with a core diameter which corresponds to the core diameter of the blind hole and in that the threaded stem is adjoined by an at least in part unthreaded shank,
   wherein the mouth of the blind hole has a diameter which is greater than the core diameter of the blind hole, in that the cross-sectional contour of the mouth is of non-rotationally symmetrical construction and in that the shank of the fastening element comprises a cross-sectional contour at least over part of its length which is conformed to the cross-sectional contour of the mouth of the blind hole.

2. The assembly of the extrusion blow molded component and the fastening element as claimed in claim 1, wherein a plurality of mutually spaced recesses or projections are provided around the circumference of the mouth of the blind hole, said recesses or projections cooperate with complementary projections or recesses, respectively, on the fastening element.

3. The assembly of the extrusion blow molded component and the fastening element as claimed in claim 1, wherein the blind hole comprises two threads.

4. The assembly of the extrusion blow molded component and the fastening element as claimed in claim 3, wherein the threads are at angle of greater than or equal to 30° relative to a length of the blind hole.

5. The assembly of the extrusion blow molded component and the fastening element as claimed in claim 1, wherein the extrusion blow molded component takes a form of a one-piece, substantially closed container.

6. The assembly of the extrusion blow molded component and the fastening element as claimed in claim 5, wherein the blind hole is provided in an outer wall of the container.

7. A method of producing the assembly of the extrusion blow molded component and the fastening element as claimed in claim 1, comprising extruding a parison from a plasticized thermoplastic and expanding the parison in a multipart blowing mold using at least one mold core provided in the mold and extendable into and retractable from the cavity of the mold.

8. The method as claimed in claim 7, wherein said at least one mold core is a multipart mold core, the outer contour of which corresponds at least in part to the outer contour of the fastening element.

9. The method as claimed in claim 8, wherein said step of expanding the parison is performed in the cavity against the at least one extendable and retractable mold core and in that the mold core is removed from the extrusion blow molded component.

\* \* \* \* \*